US012800399B2

(12) United States Patent
Hara et al.

(10) Patent No.: US 12,800,399 B2
(45) Date of Patent: Nov. 17, 2026

(54) ARRAY SENSOR

(71) Applicant: TDK CORPORATION, Tokyo (JP)

(72) Inventors: Shinji Hara, Tokyo (JP); Naoki Ohta, Tokyo (JP); Tadao Senriuchi, Tokyo (JP); Yusuke Kimoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 253 days.

(21) Appl. No.: 18/826,885

(22) Filed: Sep. 6, 2024

(65) Prior Publication Data

US 2025/0146878 A1 May 8, 2025

(30) Foreign Application Priority Data

Nov. 7, 2023 (JP) ................................ 2023-189913

(51) Int. Cl.
*G01J 5/20* (2006.01)
*G01J 5/00* (2022.01)
*G01J 5/08* (2022.01)

(52) U.S. Cl.
CPC ............... *G01J 5/20* (2013.01); *G01J 5/0859* (2013.01); *G01J 2005/0077* (2013.01); *G01J 2005/202* (2013.01)

(58) Field of Classification Search
CPC .... G01J 5/20; G01J 5/0859; G01J 2005/0077; G01J 2005/202
See application file for complete search history.

(56) References Cited

U.S. PATENT DOCUMENTS

2006/0163487 A1* 7/2006 Ambrosi .................. G01T 3/00 250/390.01
2020/0072664 A1* 3/2020 Ohta ......................... G01J 1/44
2023/0353896 A1* 11/2023 Cowley .................. H04N 25/63
2024/0413184 A1* 12/2024 Rissi ..................... H10F 39/809

FOREIGN PATENT DOCUMENTS

JP 6809519 B2 1/2021

* cited by examiner

*Primary Examiner* — Uzma Alam
*Assistant Examiner* — Richard O Toohey
(74) *Attorney, Agent, or Firm* — Oliff PLC

(57) ABSTRACT

An array sensor comprises: first wirings that, when viewed from the third direction, each extend in the first direction and are adjacent to each other in the second direction that is different from the first direction; second wirings each extending in the second direction and adjacent to each other in the first direction; detection elements each connected to both one of the first wirings and one of the second wirings; a readout circuit that reads out output signals from the detection elements; and first terminals electrically connected to the readout circuit. The first terminals form at least one first terminal line in which at least some of the first terminals are arranged side by side in the second direction. The number of the first terminals is greater than the number of the first wirings, and only some of the first terminals are electrically connected to the respective first wirings.

13 Claims, 10 Drawing Sheets

ARRAY SENSOR

FIELD

This application claims the benefit of Japanese Priority Patent Application No. JP2023-189913 filed on Nov. 7, 2023, the entire contents of which are incorporated herein by reference.

The present disclosure relates to array sensors.

BACKGROUND

Array sensors such as image sensors in which detection elements are arranged in an array are known. JP 6809519 B discloses an infrared sensor in which resistor elements, which are infrared light-receiving elements, are arranged in an array. The infrared sensor includes a circuit (readout circuit) for reading out the resistance value of each resistor element.

SUMMARY

The number and arrangement of detection elements are determined for each array sensor taking into consideration the performance of the array sensor as well as cost and size constraints. On the other hand, since the readout circuit of an array sensor is configured according to the number and arrangement of detection elements, a readout circuit must be designed for each array sensor in array sensors with different numbers and arrangements of detection elements, and this requirement places a constraint on cost reduction of array sensors.

The array sensor of the present disclosure comprises: first wirings that, when viewed from a third direction perpendicular to a plane defined by a first direction and a second direction that is different from the first direction, each extend in the first direction and are adjacent to each other in the second direction; second wirings each extending in the second direction and adjacent to each other in the first direction when viewed from the third direction; detection elements each connected to both one of the first wirings and one of the second wirings; a readout circuit that reads out output signals from the detection elements; and first terminals electrically connected to the readout circuit. The first terminals form at least one first terminal line in which at least some of the first terminals are arranged side by side in the second direction. The number of the first terminals is greater than the number of the first wirings, and only some of the first terminals are electrically connected to the respective first wirings.

The above and other objects, features, and advantages of the present application will become more apparent from the following detailed description taken in conjunction with the accompanying drawings illustrating the present application.

BRIEF DESCRIPTION OF THE DRAWINGS

The accompanying drawings are included to provide a further understanding of the disclosure and are incorporated in and constitute a part of this specification. The drawings illustrate example embodiments and together with the specification serve to explain the principles of the technology.

DETAILED DESCRIPTION

Figure 1:
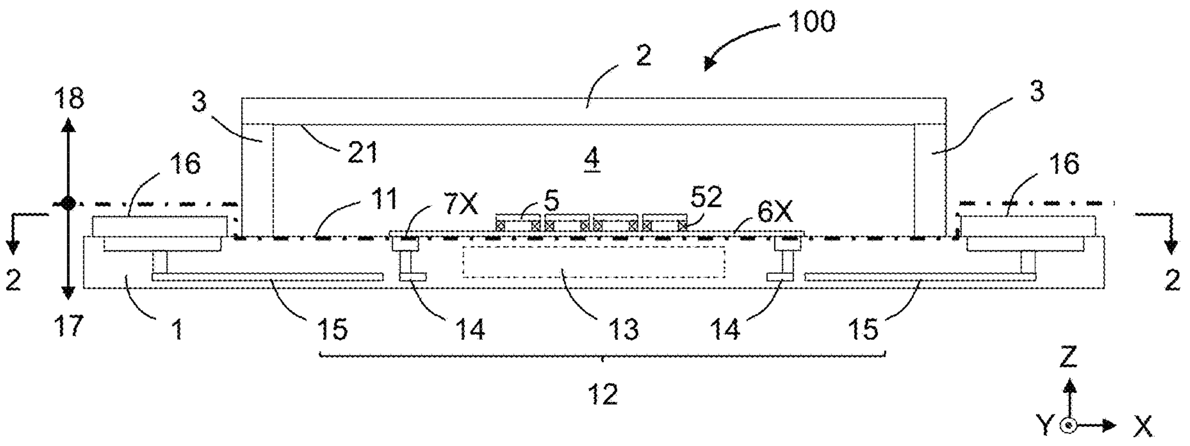
FIG. 1 is a schematic cross-sectional view of an infrared sensor according to a first embodiment.

Example embodiments and modifications of the technology are next described in detail with reference to the accompanying drawings. Note that the following description is directed to illustrative examples of the disclosure and is not to be construed as limiting the technology. Factors including but not limited to numerical values, shapes, materials, components, positions of the components, and how the components are joined to each other are illustrative only and are not to be construed as limiting the technology. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions.

An object of the present disclosure is to provide an array sensor capable of suppressing increases in costs due to differences in the number and arrangement of detection elements.

Hereinafter, several embodiments of the array sensor of the present disclosure will be described with reference to the drawings. The drawings are schematic diagrams for illustrating the present disclosure, and the shapes and dimensions of elements may not be consistent between drawings. In the following description and drawings, the first direction is referred to as the X-direction, the second direction is referred to as the Y-direction, and the third direction is referred to as the Z-direction. The X-direction and the Y-direction are parallel to principal surface 11 of first substrate 1 and principal surface 21 of second substrate 2. Principal surfaces 11 and 21 are surfaces of first substrate 1 and second substrate 2 that face each other. The X-direction and the Y-direction are perpendicular to each other. The Z-direction is a direction perpendicular to the X-direction and the Y-direction and is a direction perpendicular to principal surface 11 of first substrate 1 and principal surface 21 of second substrate 2, or the direction in which first substrate 1 and second substrate 2 are stacked. The first direction and the second direction do not have to be perpendicular to each other but may be different from each other. Therefore, the third direction (Z-direction) is a direction perpendicular to a plane (XY plane) that is defined by the first direction (X-direction) and the second direction (Y-direction) that is different from the first direction.

In the following embodiments, an infrared sensor will be described as an example of an array sensor. Infrared sensors are mainly used as imaging elements in infrared cameras. Infrared cameras can be used as night vision scopes or goggles for dark places and can also be used to measure the temperature of people and objects. In the present disclosure, the detection target is not limited to infrared rays. The array sensor of the present disclosure can also be applied to electromagnetic wave sensors that detect electromagnetic waves including terahertz waves or near-infrared regions and to CMOS sensors and CCD sensors that detect electromagnetic waves in the visible light region. In addition, the present disclosure is also applicable to various electronic devices other than electromagnetic wave sensors.

First Embodiment

Figure 2:
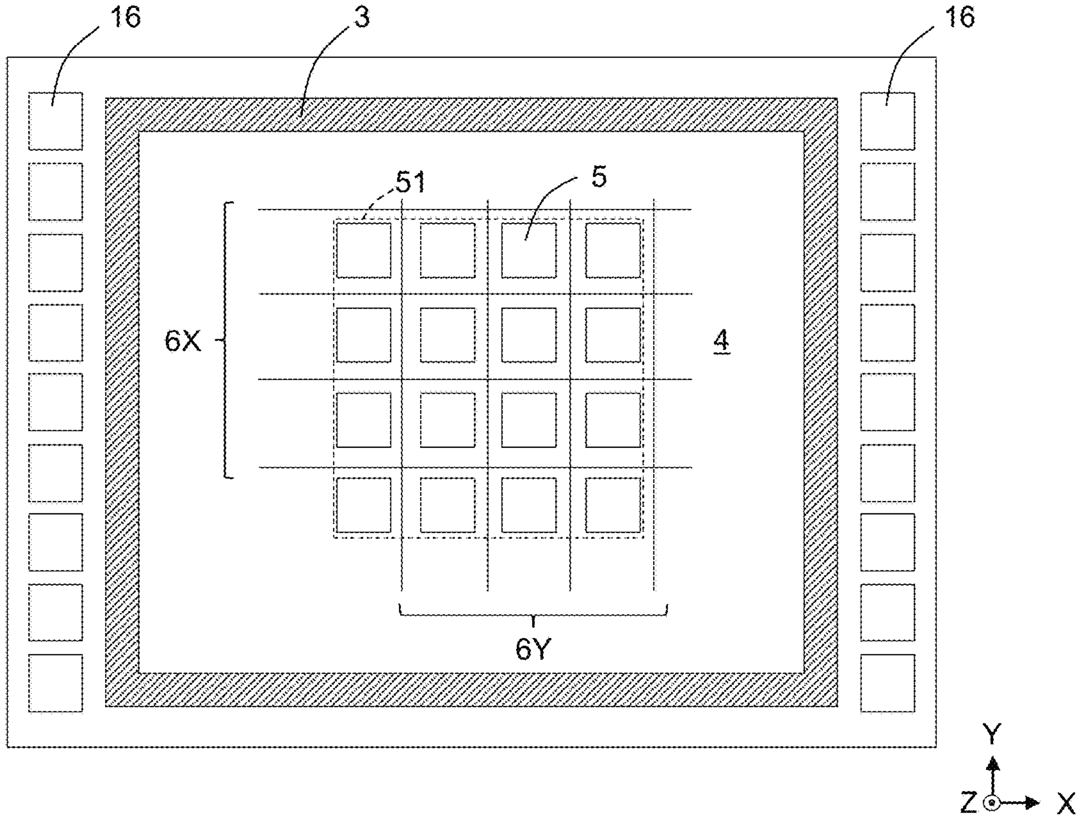
FIG. 2 is a schematic plan view showing the positional relationship of main elements when the infrared sensor shown in FIG. 1 is viewed from the Z-direction.

FIG. 1 is a schematic cross-sectional view of infrared sensor 100, and FIG. 2 is a schematic plan view showing the positional relationship of main elements when the infrared sensor shown in FIG. 1 is viewed from the Z-direction. Infrared sensor 100 comprises first substrate 1 and second substrate 2 that face each other, and side wall 3 that connects first substrate 1 and second substrate 2. Inner space 4, which is sealed, is formed by first substrate 1, second substrate 2 and side wall 3. A plurality of thermistor elements 5 (an example of a detection element) is provided in inner space 4. First substrate 1 is mainly made of a silicon substrate and includes electric circuit parts 12. Electric circuit parts 12 include readout circuit 13, internal wirings 14 and 15, and the like. Readout circuit 13 reads out the output signals of the plurality of thermistor elements 5 and is also referred to as an ROIC (Readout IC). A plurality of pads 16 for inputting and outputting signals to and from the outside are formed on first substrate 1 outside side wall 3. Pads 16 are electrically connected to readout circuit 13 by internal wiring 15. Second substrate 2 is mainly made of a silicon substrate and forms a light-incident part.

Each of thermistor elements 5 functions as a sensing part of infrared sensor 100. The plurality of thermistor elements 5 in arrangement area 51 of a rectangular (square in this embodiment) as shown in FIG. 2 and forms a two-dimensional lattice array consisting of multiple rows extending in the X-direction and multiple columns extending in the Y-direction. In FIG. 2, an array is arranged that includes four thermistor elements 5 in the X-direction and four thermistor elements 5 in the Y-direction. However, the number of thermistor elements 5 is merely an example and does not limit the present disclosure. Each thermistor element 5 is, for example, a film of vanadium oxide, titanium oxide, amorphous silicon, polycrystalline silicon, an oxide having a spinel crystal structure containing manganese, or yttrium-barium-copper oxide. Since inner space 4 is under negative pressure or in a vacuum state, gas convection in inner space 4 is prevented or suppressed, and the thermal effect on thermistor elements 5 can thus be reduced. Each thermistor element 5 is supported on first substrate 1 via two conductive pillars 52. Since each thermistor element 5 is disposed at a position away from first substrate 1, the influence of heat generation from electric circuit part 12 can be reduced.

When viewed from the Z-direction, infrared sensor 100 comprises first wirings 6X each extending in the X-direction and adjacent to each other in the Y-direction and second wirings 6Y each extending in the Y-direction and adjacent to each other in the X-direction. Each of thermistor elements 5 is connected to both one of first wirings 6X and one of second wirings 6Y via conductive pillars 52. In this embodiment, four first wirings 6X and four second wirings 6Y are arranged.

Figure 3:
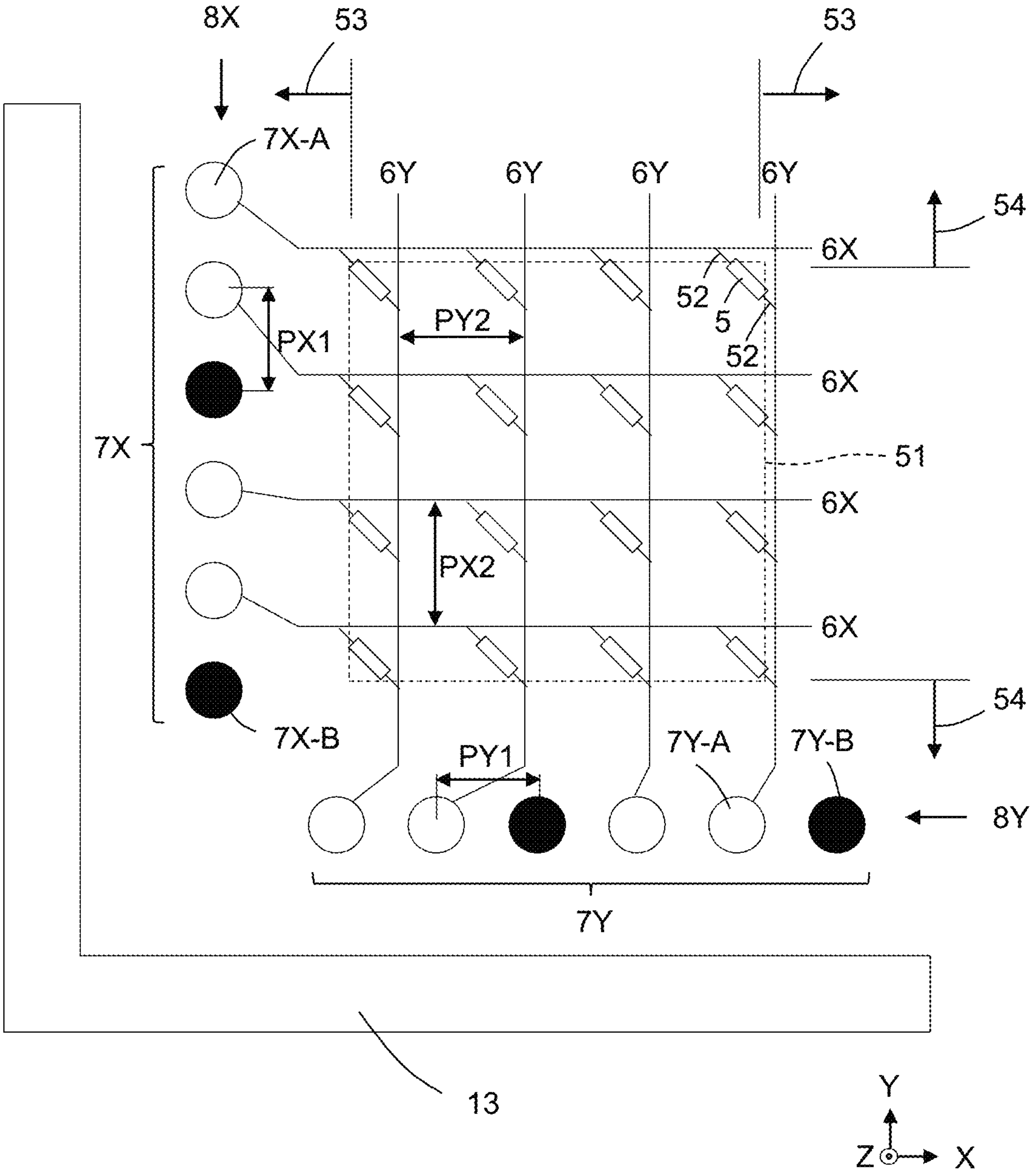
FIG. 3 is a schematic partial plan view of the infrared sensor shown in FIG. 2.

FIG. 3 is a schematic partial plan view of infrared sensor 100 showing thermistor elements 5, first and second wirings 6X and 6Y, first and second terminals 7X and 7Y, and readout circuit 13. Readout circuit 13 is a conceptual diagram and does not represent an actual area. In FIG. 3, in order to clearly show the electrical connections between thermistor elements 5 and first and second wirings 6X and 6Y, thermistor elements 5 and conductive pillars 52 are shown schematically.

When viewed from the Z-direction, a plurality (six in this embodiment) of first terminals 7X is provided on one side in the X-direction of arrangement area 51 for the plurality of thermistor elements 5. Arrangement area 51 is the smallest rectangular area that includes all thermistor elements 5 when viewed from the Z-direction and is shown slightly separated from thermistor elements 5 in FIG. 2 for the sake of convenience. "One side in the X-direction" means one of the two areas 53 that do not overlap with arrangement area 51 in the X-direction (i.e., on both sides of arrangement area 51 in the X-direction). The same applies to the "other side in the X-direction" described below. Although the "one side" refers to area 53 on the left side of arrangement area 51 in FIG. 3, it may also refer to area 53 on the right side of arrangement area 51. The plurality of first terminals 7X is electrically connected to readout circuit 13 through internal wiring 14 (see FIG. 1) of first substrate 1. The plurality of first terminals 7X is not electrically connected to any circuits inside first substrate 1 other than readout circuit 13. As shown in FIG. 3, first terminals 7X each have a pad shape. In FIG. 3, first terminals 7X each have a circular shape, but the shape is not limited thereto. First terminals 7X are functionally open ends of wirings to which other wirings can be connected, and their shape is not limited to a pad shape. As shown in FIG. 3, the plurality of first terminals 7X forms single first terminal line 8X in which at least some of first terminals 7X (six in this embodiment) are arranged in a line in the Y-direction.

The number of first terminals 7X (six in this embodiment) is greater than the number of first wirings 6X (four in this embodiment). Therefore, only some of first terminals 7X are electrically connected to respective first wirings 6X, and the other first terminals 7X are not connected to first wirings 6X. In other words, the plurality of first terminals 7X that forms one first terminal line 8X includes at least one connection terminal 7X-A electrically connected to first wiring 6X and at least one isolated terminal 7X-B electrically isolated from (or electrically unconnected to) first wiring 6X. Isolated terminal 7X-B is not electrically connected to any circuits other than readout circuit 13. In other words, isolated terminal 7X-B is an unused terminal. In addition, in FIGS. 3 to 10, connection terminals 7X-A are shown in white, and isolated terminals 7X-B are shown in black.

When viewed from the Z-direction, a plurality (six in this embodiment) of second terminals 7Y is provided on one side in the Y-direction of arrangement area 51 for the plurality of thermistor elements 5. "One side in the Y-direction" means one of two areas 54 that do not overlap with arrangement area 51 in the Y-direction (i.e., on both sides of arrangement area 51 in the Y-direction). Each of second terminals 7Y is electrically connected to readout circuit 13 through internal wiring 14 of first substrate 1. Each of second terminals 7Y is not electrically connected to any circuits inside first substrate 1 other than readout circuit 13. Each of second terminals 7Y also has a pad shape. Each of second terminals 7Y forms one second terminal line 8Y in which at least some (six in this embodiment) of second terminals 7Y are arranged side by side in the X-direction.

The number of second terminals 7Y (six in this embodiment) is greater than the number of second wirings 6Y (four in this embodiment). Therefore, only some of second terminals 7Y are electrically connected to respective second wirings 6Y, and the other second terminals 7Y are not connected to second wirings 6Y. In other words, the plurality of second terminals 7Y that forms one second terminal line 8Y includes at least one connection terminal 7Y-A that is electrically connected to any second wiring 6Y, and at least one isolated terminal 7Y-B that is electrically isolated from (or electrically unconnected to) any second wiring 6Y. Isolated terminal 7Y-B is not electrically connected to any circuit other than readout circuit 13. In other words, isolated terminal 7Y-B is an unused terminal. In addition, in FIGS. 3 to 10, connection terminals 7Y-A are shown in white, and isolated terminals 7Y-B are shown in black.

Readout circuit 13 is configured based on six first terminals 7X and six second terminals 7Y. That is, readout circuit 13 includes functional components (not shown) such as a selection transistor, an operational amplifier, an AD converter, and a memory suitable for internal wiring 14 that is connected to first terminal 7X or second terminal 7Y. In other words, all of first terminals 7X and second terminals 7Y are connected to internal wiring 14, and further, are electrically connected to readout circuit 13 via internal wiring 14. In this embodiment, two first terminals 7X and two second terminals 7Y are not used, which results in unused internal wiring 14 and functional components. A control unit (not shown) of infrared sensor 100 is configured to scan only internal wirings 14 connected to four connection terminals 7X-A and four connection terminals 7Y-A.

The number of thermistor elements 5, which corresponds to the number of pixels of infrared sensor 100, is determined taking into consideration performance, cost, size constraints, and the like. For example, when high resolution is required, the number of thermistor elements 5 may be increased. On the other hand, the sensitivity of each thermistor element 5 depends on the size of that thermistor element 5 (more precisely, the area of the heat sensing portion of thermistor element 5), and it is known that, for example, the minimum temperature difference that can be detected by thermistor element 5 becomes smaller as that thermistor element 5 becomes larger. Therefore, in order to detect smaller temperature differences in the object to be measured, the size of each thermistor element 5 may be increase. However, if arrangement area 51 of thermistor elements 5 is constant, increasing the size of thermistor elements 5 leads to a reduction in the number of thermistor elements 5. Thus, a configuration with a large number of thermistor elements 5 and a configuration with a small number of thermistor elements 5 each have advantages and disadvantages, and the configuration can be selected according to the purpose.

Conventionally, readout circuits 13 have been designed and manufactured individually according to the number of rows of thermistor elements 5 (the number of thermistor elements 5 arranged in the Y-direction) and the number of columns of thermistor elements 5 (the number of thermistor elements 5 arranged in the X-direction). In other words, first substrate 1 is designed and manufactured in accordance with the number of rows and columns of thermistor elements 5. For example, the resolution of infrared sensor 100 can be increased by increasing the number of thermistor elements 5 while keeping arrangement area 51 of thermistor elements 5 constant. However, in this case, the number of thermistor elements 5 changes, and first substrate 1 must be redesigned. If the number of thermistor elements 5 is the same but the number of rows and columns is different, first substrate 1 must also be redesigned.

The effort required to design first substrate 1 for each infrared sensor 100 having a different array configuration (the number of rows and columns of thermistor elements 5) is significant, resulting in problems such as increased costs and longer product development times. Furthermore, first substrate 1 must be manufactured for each array configuration, which leads to a decrease in manufacturing efficiency and an increase in costs. In this embodiment, unused internal wiring 14 and functional components are permitted, and the design and manufacture of first substrate 1 can be standardized for infrared sensors 100 with different array configurations, making it possible to reduce the severity of these issues.

Each of first wirings 6X is electrically connected to a corresponding first terminal 7X by solder or the like. Each of second wirings 6Y is electrically connected to a corresponding second terminal 7Y by solder or the like. As shown in FIG. 1, first wiring 6X and second wiring 6Y are disposed on the surface of first substrate 1. Although first wirings 6X and second wirings 6Y are exposed, first wirings 6X and second wirings 6Y may be covered with a protective film. First wirings 6X and second wirings 6Y are formed in a later process than first terminals 7X and second terminals 7Y. However, since first terminals 7X and second terminals 7Y each have the shape of a pad as described above, electrical connection with first wirings 6X and second wirings 6Y can be easily made. Pads 16 are prepared in advance in accordance with readout circuit 13. Therefore, as shown in FIG. 1, most of first substrate 1 becomes common area 17, and first wirings 6X and second wirings 6Y, pillars 52, and thermistor elements 5 formed thereon become individual areas 18 which are individually designed and manufactured. However, most of first substrate 1 is common area 17, and common area 17 can be manufactured collectively in advance, which makes it possible to streamline and simplify the process in terms of both design and production.

Figure 4:
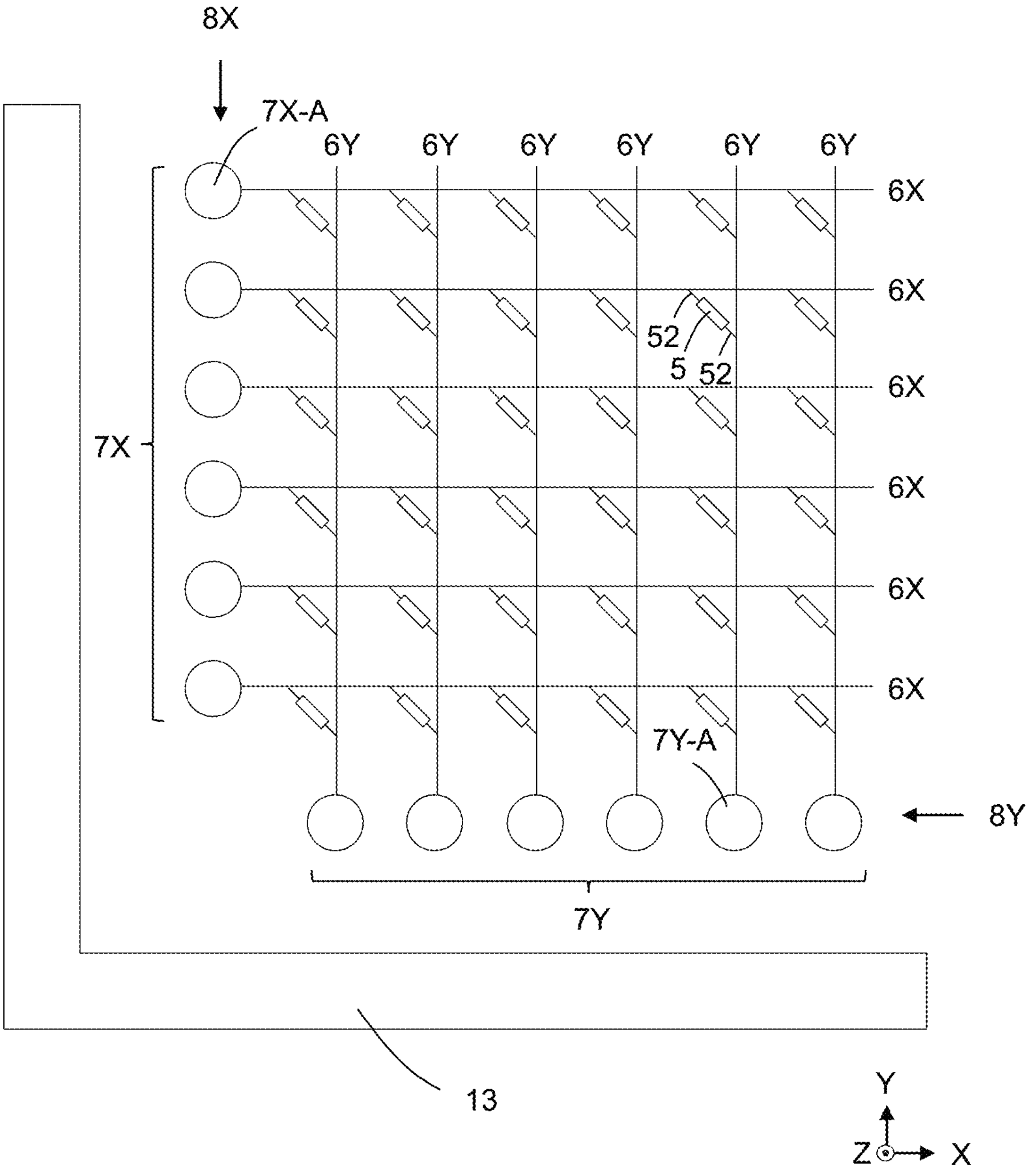
FIG. 4 is a schematic partial plan view of an infrared sensor having detection elements in an array configuration different from the infrared sensor shown in FIG. 3.
Figure 5:
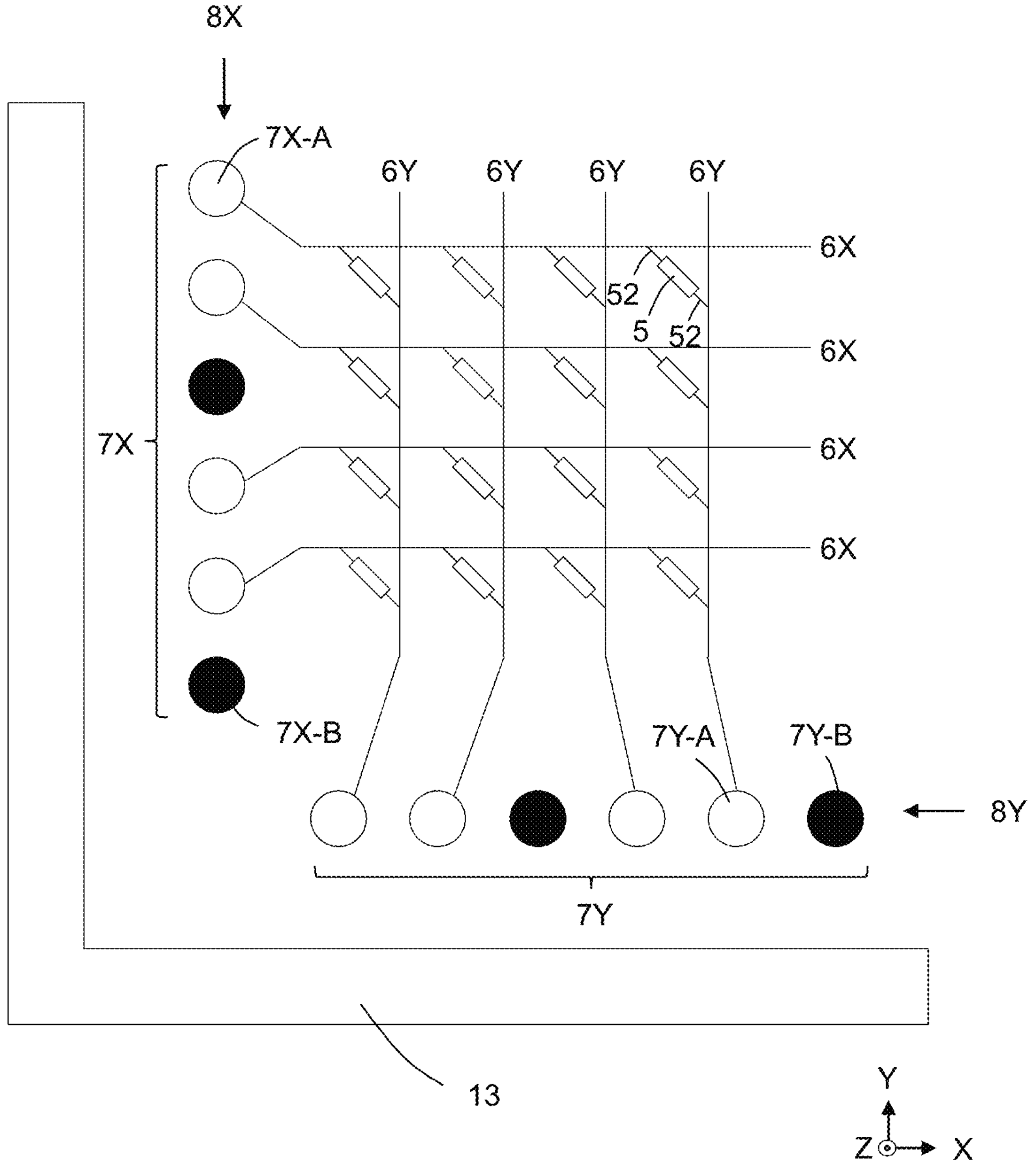
FIG. 5 is a schematic partial plan view of another infrared sensor having detection elements in an array configuration different from the infrared sensor shown in FIG. 3.

FIG. 4 is a schematic partial plan view of infrared sensor 100 in which thermistor elements 5 are arranged in 6 rows and 6 columns. All of first terminals 7X are electrically connected to respective first wirings 6X, and all of second terminals 7Y are electrically connected to respective second wirings 6Y, but common area 17 is the same as in FIG. 1. Although not shown, if the number of thermistor elements 5 is within a range of 6 rows and 6 columns (for example, 4 rows and 6 columns, 5 rows and 5 columns, etc.), common area 17 is the same as that in FIG. 1. FIG. 5 is a schematic partial plan view of infrared sensor 100 in which smaller thermistor elements 5 than those in FIG. 3 are arranged in 4 rows and 4 columns. The number of first terminals 7X and second terminals 7Y that are used is the same as in FIG. 3, but the routes of first wirings 6X and second wirings 6Y are changed. In this example, common area 17 is the same as in FIG. 1, and the route changes of first wirings 6X and second wirings 6Y can be accommodated in individual area 18.

Referring again to FIG. 3, the average spacing PX1 in the Y-direction between first terminals 7X that form one first terminal line 8X is smaller than the average spacing PX2 in the Y-direction between first wirings 6X. In this embodiment, all of first terminals 7X are arranged at equal intervals in the Y-direction, and the average interval PX1 consequently matches the interval in the Y-direction between adjacent first terminals 7X, but the intervals in the Y-direction between first terminals 7X may be different from each other. Similarly, the average spacing PY1 in the X-direction between second terminals 7Y that form one second terminal line 8Y is smaller than the average spacing PY2 in the X-direction between second wirings 6Y. In this embodiment, all of second terminals 7Y are arranged at equal intervals in the X-direction, and the average interval PY2 consequently matches the interval in the X-direction between adjacent second terminals 7Y, but the intervals in the X-direction between the second terminals 7Y may be different from each other.

In this embodiment, the plurality of first terminals 7X that forms one first terminal line 8X includes a plurality (two in this embodiment) of isolated terminals 7X-B, and at least one connection terminal 7X-A is disposed between each one isolated terminal 7X-B and another isolated terminal 7X-B that is closest to the one isolated terminal 7X-B in the Y-direction. In other words, none of isolated terminals 7X-B is adjacent to another isolated terminal 7X-B. In addition, in the modification shown in FIG. 6, the plurality of first terminals 7X that forms one first terminal line 8X includes a plurality of connection terminals 7X-A, and at least one isolated terminal 7X-B is disposed between each one connection terminal 7X-A and another connection terminal 7X-A that is closest to the one connection terminal 7X-A in the Y-direction. In other words, none of connection terminals 7X-A is adjacent to another connection terminal 7X-A. In either configuration, connection terminals 7X-A are distributed in the Y-direction, and as a result, first wirings 6X are distributed in the portion between arrangement area 51 and first terminal line 8X. As a result, the possibility that first wirings 6X come into contact with each other or that first wirings 6X will be electrically connected to incorrect first terminals 7X is reduced, leading to improved reliability of infrared sensor 100. In addition, because each first wiring 6X can be easily connected to a nearby first terminal 7X, the total length of first wirings 6X between arrangement area 51 and first terminal line 8X can be reduced. In the modification shown in FIG. 6, three first wirings 6X and three second wirings 6Y are arranged.

Figure 6:
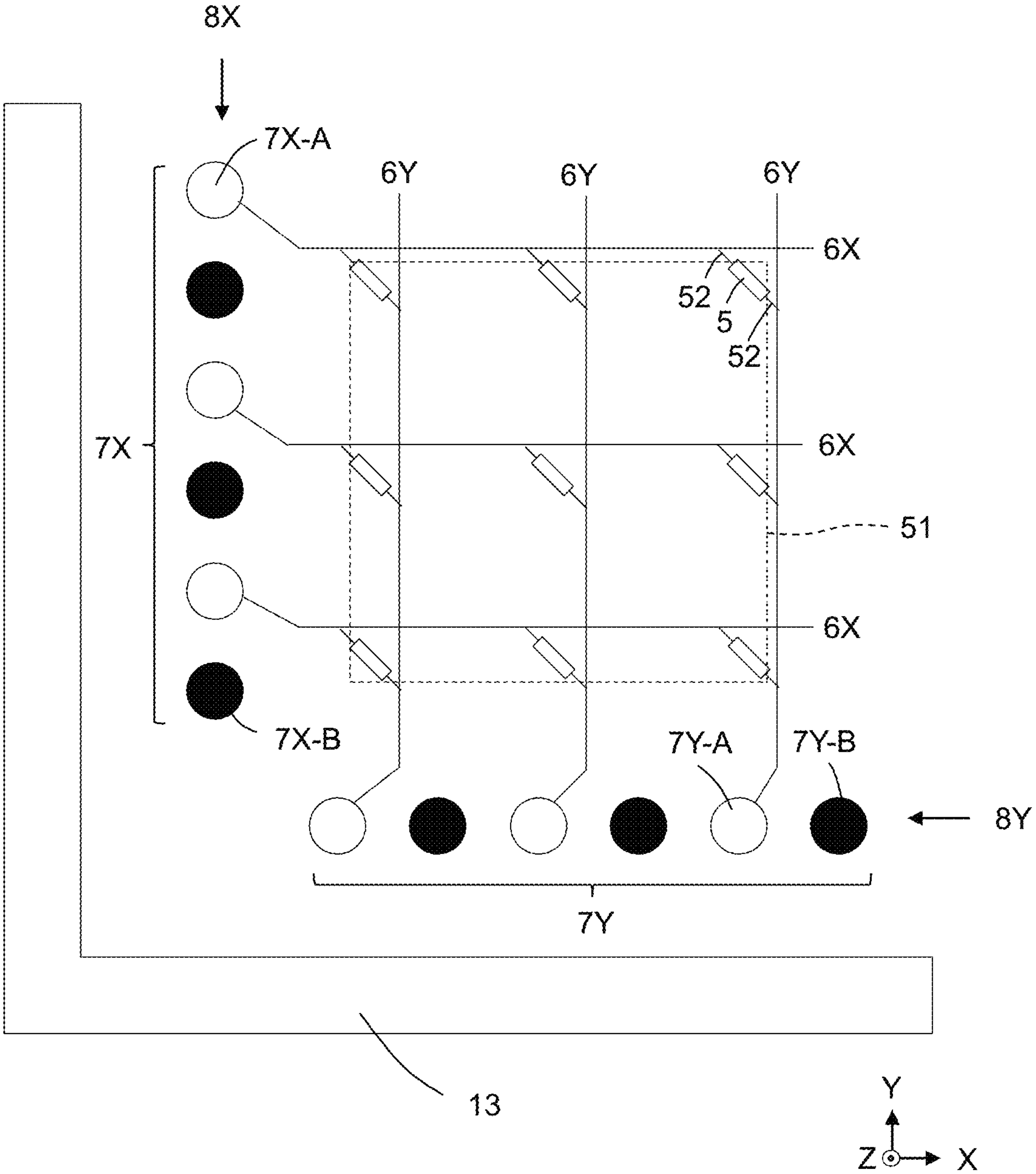
FIG. 6 is a schematic partial plan view of an infrared sensor according to a modification of the first embodiment.

The same applies to second terminals 7Y. As shown in FIG. 3, the plurality of second terminals 7Y that forms one second terminal line 8Y includes a plurality (two in this embodiment) of isolated terminals 7Y-B, and at least one connection terminal 7Y-A is disposed between each one isolated terminal 7Y-B and another isolated terminal 7Y-B that is closest to the one isolated terminal 7Y-B in the X-direction. Also, as shown in FIG. 6, the plurality of second terminals 7Y that forms one second terminal line 8Y includes a plurality of connection terminals 7Y-A, and at least one isolated terminal 7Y-B is disposed between each one connection terminal 7Y-A and another connection terminal 7Y-A that is closest to the one connection terminal 7Y-A in the X-direction.

Second Embodiment

Figure 7:
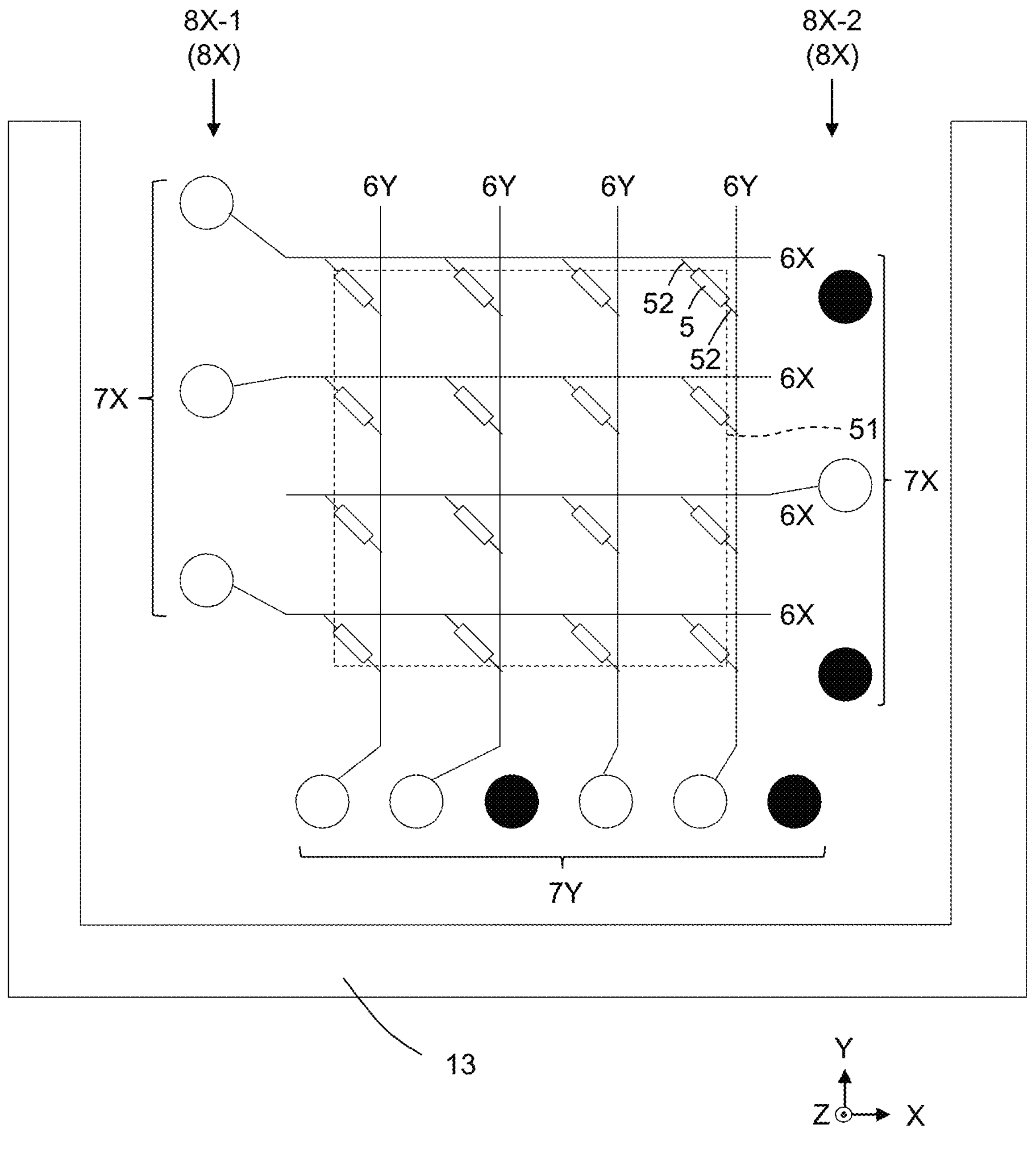
FIG. 7 is a schematic partial plan view of an infrared sensor according to a second embodiment.
Figure 8:
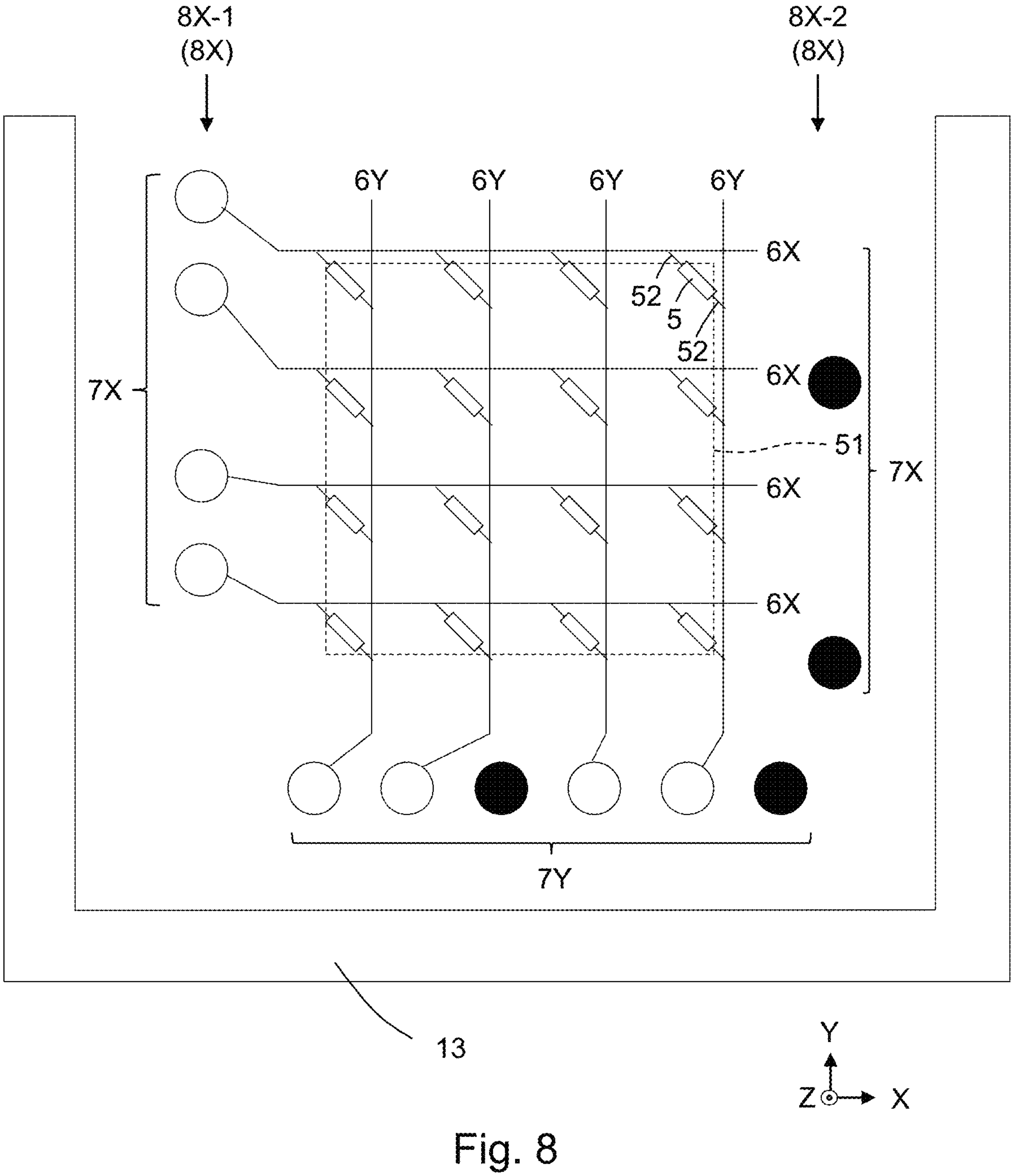
FIG. 8 is a schematic partial plan view of an infrared sensor according to a modification of the second embodiment.

FIG. 7 is a schematic plan view showing thermistor elements 5, first and second wirings 6X and 6Y, first and second terminal lines 8X and 8Y, and readout circuit 13 of infrared sensor 100 according to the second embodiment. Infrared sensor 100 comprises a plurality (two in this embodiment) of first terminal lines 8X. When viewed from the Z-direction, first terminal line 8X-1, which is a part of the plurality of first terminal lines 8X, is disposed on one side in the X-direction of arrangement area 51, and first terminal line 8X-2, which is the remainder of the plurality of first terminal lines 8X, is disposed on the other side in the X-direction of arrangement area 51. That is, when viewed from the Z-direction, one first terminal line 8X is disposed on each of both sides in the X-direction of arrangement area 51.

Each of first terminals 7X has a pad shape and may be relatively large in size. Therefore, depending on the arrangement interval of thermistor elements 5, in order to ensure appropriate intervals between first terminals 7X, the length in the X-direction of first terminal line 8X may become larger than arrangement area 51. This leads to an increase in the size of infrared sensor 100 and an increase in the length of first wirings 6X. In this embodiment, first terminal line 8X-1 is disposed on one side in the X-direction of arrangement area 51, and first terminal line 8X-2 is disposed on the other side in the X-direction of arrangement area 51. Therefore, compared to an embodiment in which one first terminal line 8X is disposed on one side in the X-direction of arrangement area 51 (see, for example, FIG. 3), the length of each of first terminal lines 8X-1 and 8X-2 can be shortened, making such problems less likely to occur. All of first terminals 7X that are included in the terminal line on one side (first terminal line 8X-1) are electrically connected to respective first wirings 6X. In the modification shown in FIG. 8, all of first terminals 7X that are included in first terminal line 8X-2 that is disposed on the other side are electrically isolated from first wirings 6X. The number of first terminal lines 8X is not limited, and three or more first terminal lines 8X may be provided.

Third Embodiment

Figure 9:
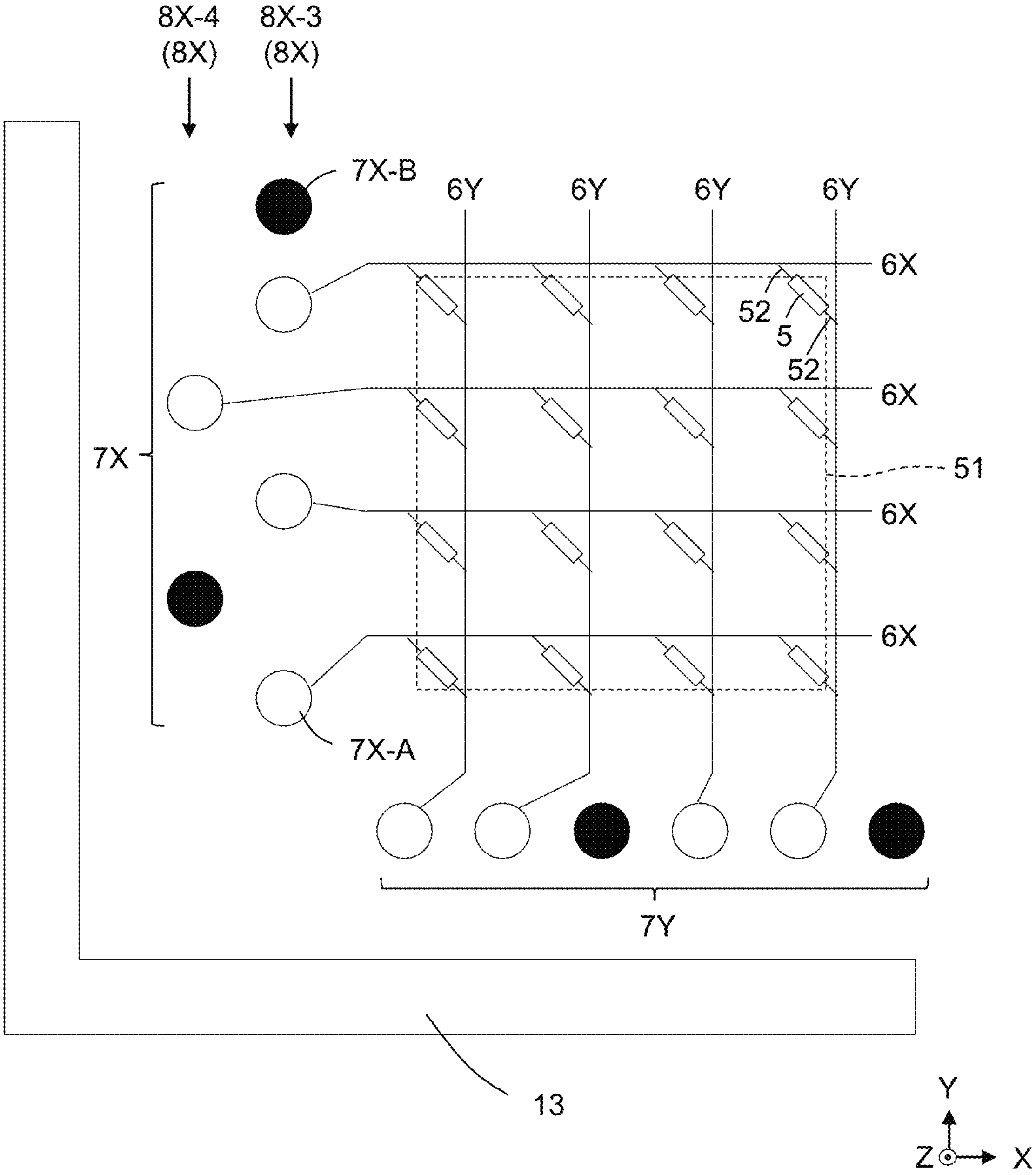
FIG. 9 is a schematic partial plan view of an infrared sensor according to a third embodiment.
Figure 10:
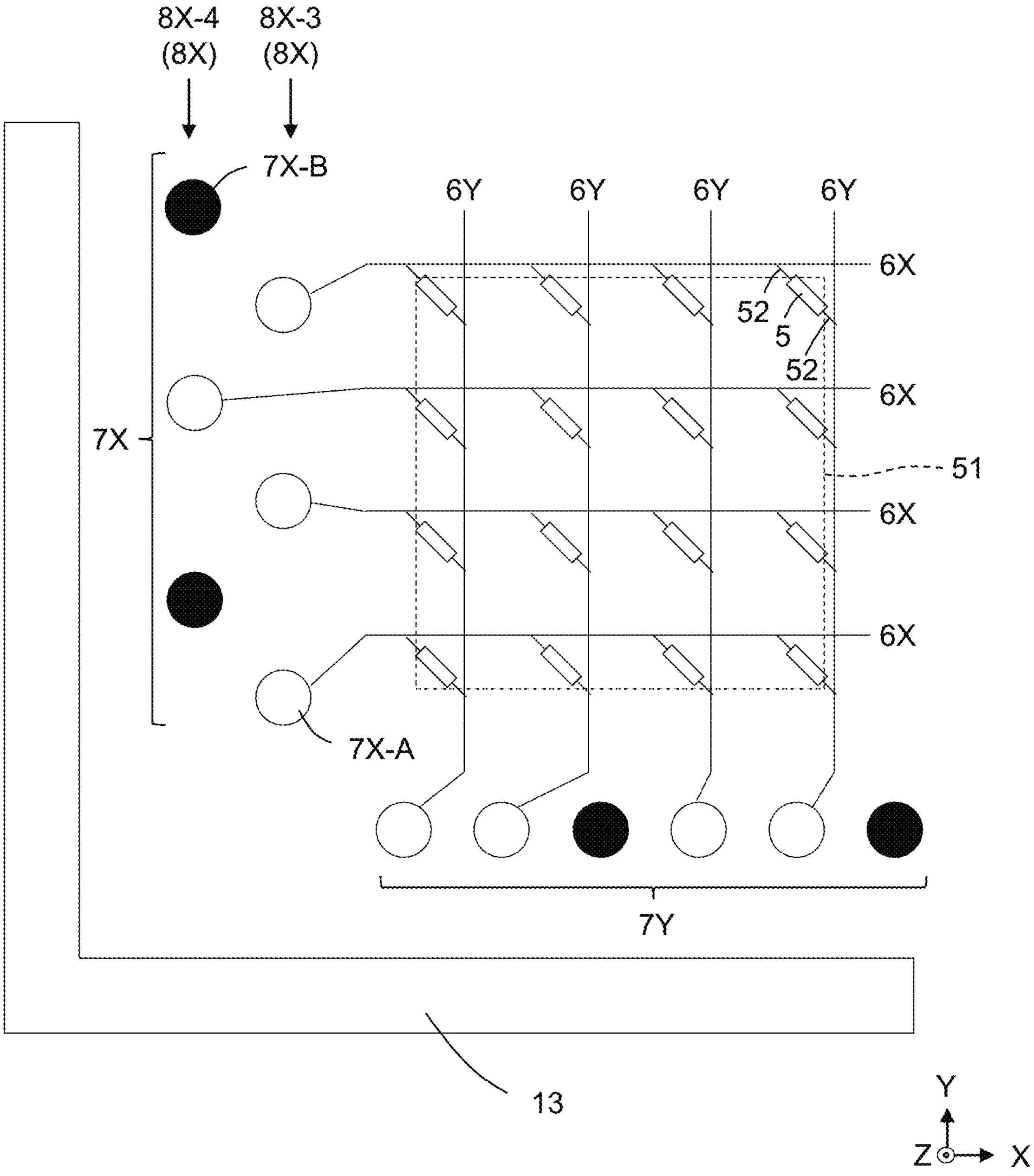
FIG. 10 is a schematic partial plan view of an infrared sensor according to a modification of the third embodiment.

FIG. 9 is a schematic plan view showing thermistor elements 5, first and second wirings 6X and 6Y, first and second terminal lines 8X and 8Y, and readout circuit 13 of infrared sensor 100 according to the third embodiment. When viewed from the Z-direction, infrared sensor 100 comprises a plurality (two in this embodiment) of first terminal lines 8X on one side in the X-direction of arrangement area 51 of the detection elements. When viewed from the Z-direction, the plurality of first terminal lines 8X includes first inner terminal line 8X-3 and first outer terminal line 8X-4 that is farther from arrangement area 51 in the X-direction than first inner terminal line 8X-3. In this embodiment as well, since a plurality of first terminal lines 8X are provided, the length of each of first terminal lines 8X-3 and 8X-4 is shortened, and the same effect as in the second embodiment is achieved.

The number of connection terminals 7X-A that are included in first inner terminal line 8X-3 is greater than the number of connection terminals 7X-A that are included in first outer terminal line 8X-4. This arrangement allows the total length of first wirings 6X to be shortened. In the modification shown in FIG. 10, the number of isolated terminals 7X-B that are included in first outer terminal line 8X-4 is greater than the number of isolated terminals 7X-B that are included in first inner terminal line 8X-3. In both configurations shown in FIGS. 9 and 10, the proportion of connection terminals 7X-A in first inner terminal line 8X-3 (75% in FIG. 9, 100% in FIG. 10) is greater than the proportion of connection terminals 7X-A in first outer terminal line 8X-4 (50% in FIG. 9, approximately 33% in FIG. 10). In other words, the proportion of isolated terminals 7X-B in first outer terminal line 8X-4 is greater than the proportion of isolated terminals 7X-B in first inner terminal line 8X-3.

The second and third embodiments may also be combined. Although not shown, for example, a plurality of first terminal lines 8X can be provided on each side in the X-direction of arrangement area 51 when viewed from the Z-direction. Alternatively, when viewed from the Z-direction, a plurality of first terminal lines 8X can be provided on one side in the X-direction of arrangement area 51, and one first terminal line 8X can be provided on the other side. In addition, while the above embodiments have been described mainly with respect to first terminals 7X, second terminals 7Y can also be provided with second terminal lines 8Y on both sides of arrangement area 51, similar to first terminal lines 8X in the second embodiment, and second terminal lines 8Y can be provided in a plurality of lines on one side or the other side of arrangement area 51, similar to first terminal lines 8X in the third embodiment.

Fourth Embodiment

Figure 11:
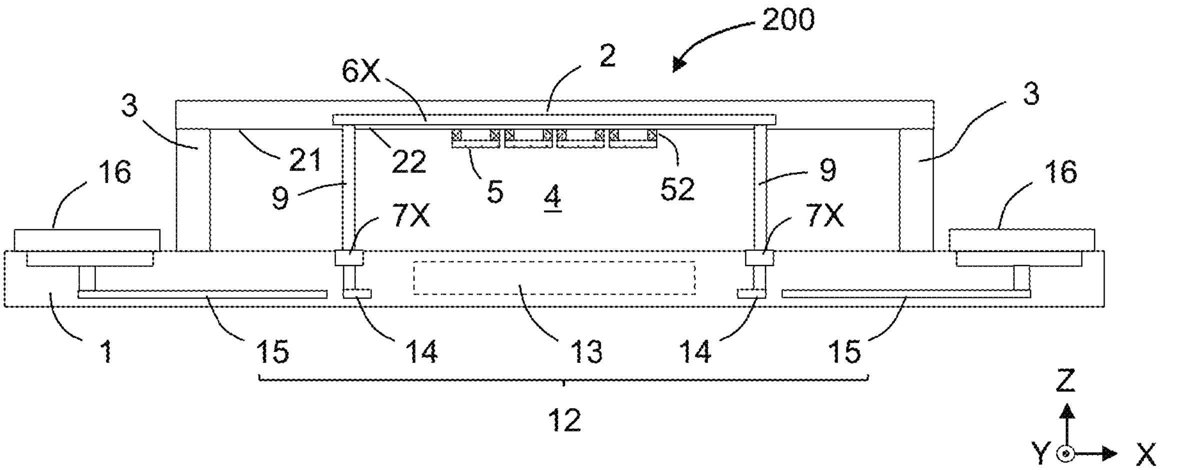
FIG. 11 is a schematic cross-sectional view of an infrared sensor according to a fourth embodiment.
Figure 12:
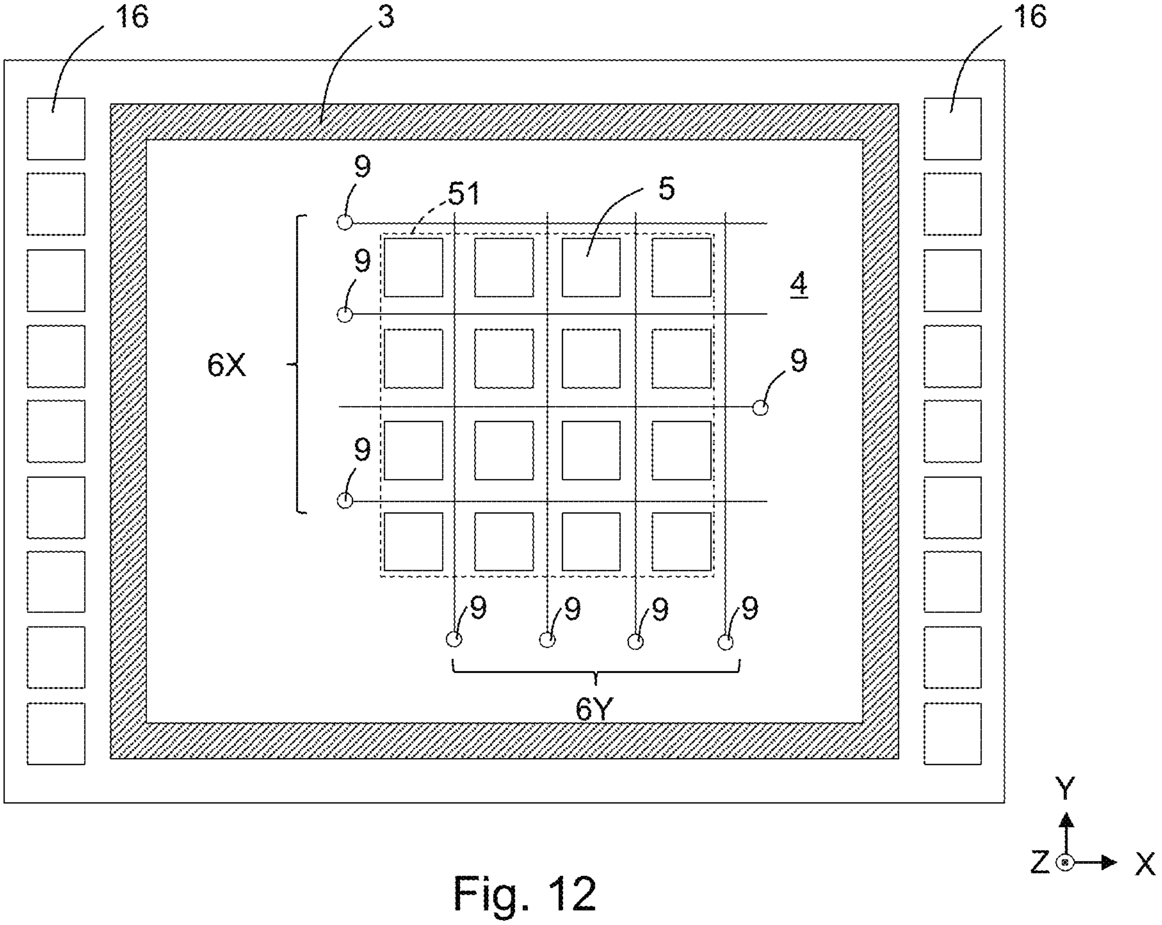
FIG. 12 is a schematic plan view showing the positional relationship of main elements when the infrared sensor shown in FIG. 11 is viewed from the Z-direction.

FIG. 11 is a schematic cross-sectional view of infrared sensor 200 according to the fourth embodiment. FIG. 12 is a schematic plan view showing the positional relationship of main elements when infrared sensor 200 shown in FIG. 11 is viewed in a plan view from the Z-direction. First and second wirings 6X and 6Y (second wirings 6Y are not shown in FIG. 11) are provided on second substrate 2, and the plurality of thermistor elements 5 is supported on second substrate 2 via pillars 52. Readout circuit 13 is provided on first substrate 1, as in the first to third embodiments. In the example shown in FIGS. 11 and 12, first terminals 7X and second terminals 7Y are configured similarly to the second embodiment shown in FIG. 7 and provided on first substrate 1. First terminals 7X and second terminals 7Y of infrared sensor 200 according to the fourth embodiment may be configured in the same manner as in the modification of the second embodiment shown in FIG. 8, may be configured in the same manner as in the first embodiment, or may be configured in the same manner as in the third embodiment. The plurality of thermistor elements 5 and first and second wirings 6X and 6Y are configured in the same manner as in the first to third embodiments, and are arranged in a lattice pattern. The structure of pillars 52 is similar to that of the first to third embodiments. First wiring 6X and second wiring 6Y are covered with protective layer 22. In this embodiment, as compared with the first to third embodiments, the plurality of thermistor elements 5 is provided at positions away from first substrate 1, and therefore the influence of heat generation in electric circuit part 12 can be further reduced.

First substrate 1 and second substrate 2 are connected by a plurality of electrical connection members 9 disposed in inner space 4. Electrical connection members 9 are pillar-shaped conductors and can be produced by, for example, plating. Electrical connection members 9 are electrically connected to respective first wirings 6X or respective second wirings 6Y. Electrical connection members 9 that are electrically connected to respective first wirings 6X are connected to respective connection terminals 7X-A of first terminal 7X by solder or the like. Electrical connection members 9 that are electrically connected to respective second wirings 6Y are connected to respective connection terminals 7Y-A of second terminal 7Y by solder or the like. In other words, only some (connection terminals 7X-A) of first terminals 7X are electrically connected to respective first wirings 6X via respective electrical connection members 9. Further, only some (connection terminals 7Y-A) of second terminals 7Y are electrically connected to respective second wirings 6Y via respective electrical connection members 9. The illustrated example corresponds to the second embodiment in which first terminal lines 8X-1 are provided on both sides of arrangement area 51 in the X-direction, and therefore electrical connection members 9 are also provided on both sides of arrangement area 51 in the X-direction, but electrical connection members 9 can be provided in accordance with the arrangement of connection terminals 7X-A and connection terminals 7Y-A. The plurality of thermistor elements 5 is connected to readout circuit 13 by first and second wirings 6X and 6Y and electrical connection members 9. Therefore, electrical connection member 9 can be omitted at the positions of first terminals 7X and second terminals 7Y that are not electrically connected to first and second wirings 6X and 6Y. Thus, this embodiment is configured in the same manner as the first to third embodiments, with the exceptions that first and second wirings 6X and 6Y are provided on second substrate 2, the plurality of thermistor elements 5 is supported on second substrate 2 via pillars 52, and electrical connection members 9 are provided. Therefore, this embodiment can also achieve the same effects as the first to third embodiments.

According to the present disclosure, it is possible to provide an array sensor that can suppress increases in costs resulting from differences in the number and arrangement of detection elements.

Although certain embodiments of the present disclosure have been illustrated and described in detail, it will be understood that various changes and modifications can be made therein without departing from the spirit or scope of the appended claims.

LIST OF REFERENCE NUMERALS

1 first substrate
2 second substrate
3 side wall
4 inner space
5 thermistor element (detection element)
6X first wiring
6Y second wiring
7X first terminal
7X-A connection terminal
7X-B isolated terminal
7Y second terminal
8X, 8X-1, 8X-2 first terminal line
8X-3 first inner terminal line
8X-4 first outer terminal line
8Y second terminal line
9 electrical connection member
13 readout circuit
51 thermistor element (detection element) arrangement area
100, 200 Infrared sensor (array sensor)
X first direction
Y second direction

The invention claimed is:

1. An array sensor comprising:

first wirings that, when viewed from a third direction perpendicular to a plane defined by a first direction and a second direction that is different from the first direction, each extend in the first direction and are adjacent to each other in the second direction;

second wirings each extending in the second direction and adjacent to each other in the first direction when viewed from the third direction;

detection elements each connected to both one of the first wirings and one of the second wirings;

a readout circuit that reads out output signals from the detection elements; and first terminals electrically connected to the readout circuit, wherein:

the first terminals form at least one first terminal line in which at least some of the first terminals are arranged side by side in the second direction; and the number of the first terminals is greater than the number of the first wirings, and only some of the first terminals are electrically connected to the respective first wirings.

2. The array sensor according to claim 1, wherein an average spacing in the second direction of the first terminals that form one of the at least one first terminal line is smaller than an average spacing in the second direction of the first wirings.

3. The array sensor according to claim 1, wherein:

the first terminals that form one of the at least one first terminal line include at least one connection terminal each electrically connected to corresponding one of the first wirings and isolated terminals that are electrically isolated from the first wirings; and the at least one connection terminal is disposed between each one isolated terminal of the isolated terminals and another isolated terminal of the isolated terminals that is closest to the one isolated terminal in the second direction.

4. The array sensor according to claim 1, wherein:

the first terminals that form one of the at least one first terminal line include connection terminals that are electrically connected to the respective first wirings and at least one isolated terminal that is electrically isolated from the first wirings; and the at least one isolated terminal is disposed between each one connection terminal of the connection terminals and another connection terminal of the connection terminals that is closest to the one connection terminal in the second direction.

5. The array sensor according to claim 1, wherein:

the at least one first terminal line includes a plurality of first terminal lines;

when viewed from the third direction, some of the first terminal lines are disposed on one side in the first direction of an arrangement area of the detection elements, and a remainder of the first terminal lines are disposed on an other side in the first direction of the arrangement area; and all of the first terminals that are included in the first terminal lines disposed on the one side are electrically connected to the respective first wirings.

6. The array sensor according to claim 1, wherein:

the at least one first terminal line includes a plurality of first terminal lines;

when viewed from the third direction, some of the first terminal lines are disposed on one side in the first direction of an arrangement area of the detection elements, and a remainder of the first terminal lines are disposed on an other side in the first direction of the arrangement area; and all of the first terminals that are included in the first terminal lines disposed on the other side are electrically isolated from the first wirings.

7. The array sensor according to claim 1, wherein:

when viewed from the third direction, the at least one first terminal line includes a first inner terminal line on one side in the first direction of an arrangement area of the detection elements, and a first outer terminal line farther from the arrangement area in the first direction than the first inner terminal line; and the number of the first terminals that are included in the first inner terminal line and that are electrically connected to the respective first wirings is greater than the number of the first terminals that are included in the first outer terminal line and that are electrically connected to the respective first wirings.

8. The array sensor according to claim 1, wherein:

when viewed from the third direction, the at least one first terminal line includes a first inner terminal line on one side in the first direction of an arrangement area of the detection elements, and a first outer terminal line farther from the arrangement area in the first direction than the first inner terminal line; and the number of the first terminals that are included in the first outer terminal line and that are electrically isolated from the first wirings is greater than the number of the first terminals that are included in the first inner terminal line and that are electrically isolated from the first wirings.

9. The array sensor according to claim 1, wherein:

when viewed from the third direction, the at least one first terminal line includes a first inner terminal line on one side in the first direction of an arrangement area of the detection elements, and a first outer terminal line farther from the arrangement area in the first direction than the first inner terminal line; and a percentage of the first terminals in the first inner terminal line that are electrically connected to the respective first wirings is greater than a percentage of the first terminals in the first outer terminal line that are electrically connected to the respective first wirings.

10. The array sensor according to claim 1, further comprising second terminals that are electrically connected to the readout circuit, wherein:

the second terminals form at least one second terminal line in which at least some of the second terminals are arranged side by side in the first direction; and the number of the second terminals is greater than the number of the second wirings, and only some of the second terminals are electrically connected to the respective second wirings.

11. The array sensor according to claim 10, wherein an average spacing in the first direction of the second terminals that form one of the at least one second terminal line is smaller than an average spacing in the first direction of the second wirings.

12. The array sensor according to claim 1, further comprising: a first substrate and a second substrate that face each other; and a side wall that is provided between the first substrate and the second substrate and that forms an inner space together with the first substrate and the second substrate, wherein the first wirings, the second wirings, the first terminals, and the readout circuit are provided on the first substrate, and the detection elements are supported on the first substrate.

13. The array sensor according to claim 1, further comprising:

a first substrate and a second substrate that face each other; a side wall that is provided between the first substrate and the second substrate and that forms an inner space together with the first substrate and the second substrate; and electrical connection members that are provided in the inner space and that connect the first substrate and the second substrate, wherein:

the first wirings and the second wirings are provided on the second substrate; the first terminals and the readout circuit are provided on the first substrate; the detection elements are supported on the second substrate; and only some of the first terminals are electrically connected to the respective first wirings via the respective electrical connection members.

* * * * *